United States Patent
Yoshida

(10) Patent No.: US 12,515,932 B2
(45) Date of Patent: Jan. 6, 2026

(54) POSITION IDENTIFICATION SYSTEM, TRANSPORT VEHICLE, POSITION IDENTIFICATION METHOD AND RECORDING MEDIUM

(71) Applicant: Mitsubishi Logisnext Co., Ltd., Kyoto (JP)

(72) Inventor: Tetsuro Yoshida, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 38 days.

(21) Appl. No.: 18/772,255

(22) Filed: Jul. 14, 2024

(65) Prior Publication Data

US 2025/0263278 A1 Aug. 21, 2025

(30) Foreign Application Priority Data

Feb. 15, 2024 (JP) ................... 2024-021317

(51) Int. Cl.
 *B66F 9/075* (2006.01)
 *B66F 9/06* (2006.01)
(52) U.S. Cl.
 CPC ............ *B66F 9/0755* (2013.01); *B66F 9/063* (2013.01)
(58) Field of Classification Search
 CPC ............................... B66F 9/0755; B66F 9/063
 See application file for complete search history.

(56) References Cited

U.S. PATENT DOCUMENTS

2022/0128998 A1  4/2022  Lin

FOREIGN PATENT DOCUMENTS

| EP | 4438544 | 10/2024 |
|----|---------|---------|
| EP | 4439115 | 10/2024 |
| JP | 2020030642 | 2/2020 |
| JP | 2023030983 | 3/2023 |

OTHER PUBLICATIONS

"Search Report of Europe Counterpart Application", issued on Jan. 21, 2025, p. 1-p. 10.
"Office Action of Europe Counterpart Application", issued on Oct. 10, 2025, p. 1-p. 7.

*Primary Examiner* — Mathew Franklin Gordon
(74) *Attorney, Agent, or Firm* — JCIPRNET

(57) ABSTRACT

A position identification system includes a point group acquisition part 22 that horizontally irradiates light into a space above a loading platform Ta to acquire a point group PG, an analysis part, and a position identification part. The analysis part analyzes the acquired point group PG using frequency distribution with a distance in the X-axis direction as an axis. The position identification part identifies a region D2 with substantially no frequency as a cargo placing space based on an analysis result of the point group PG, and identifies sections S1 and S2 with a predetermined frequency or more adjacent to the cargo placing space as the positions of edges in the X-axis coordinate of an object adjacent to the cargo placing space.

15 Claims, 10 Drawing Sheets

POSITION IDENTIFICATION SYSTEM, TRANSPORT VEHICLE, POSITION IDENTIFICATION METHOD AND RECORDING MEDIUM

CROSS-REFERENCE TO RELATED APPLICATION

This application claims the priority benefits of Japanese application no. 2024-021317, filed on Feb. 15, 2024. The entirety of the above-mentioned patent application is hereby incorporated by reference herein and made a part of this specification.

BACKGROUND

Technical Field

The disclosure relates to a position identification system for identifying the position of an edge of an object related to a cargo handling position of a transport vehicle.

Description of Related Art

As disclosed in Patent Document 1 (Japanese Patent Application Laid-Open No. 2020-030642), an unmanned transport vehicle that travels autonomously and performs cargo handling work is known. This type of unmanned transport vehicle is equipped with forks, a lifting device that raises and lowers the forks, and a laser scanner that detects the vehicle's own position. The unmanned transport vehicle is configured to move to a predetermined cargo handling position while detecting the vehicle's own position, and perform cargo handling work by raising and lowering the forks.

As shown in FIG. 10A and FIG. 10B, this type of unmanned transport vehicle 100 may perform cargo handling work on a loading platform Ta of a truck T or the like. However, unlike a fixed shelf, the truck T may not be parked at a fixed position. Therefore, the unmanned transport vehicle 100 cannot determine the cargo handling position in advance. In addition, since the length of the loading platform Ta of the truck T differs depending on the type of the truck, the cargo handling position differs for each truck T even if the truck T is parked at a fixed position. Furthermore, in order to effectively utilize the loading platform Ta of the truck T, it is necessary to pack the cargo L onto the loading platform Ta, and for this reason, the position of the cargo L loaded onto the loading platform Ta must be identified first before the position of the cargo L to be placed next can be determined.

For example, an unmanned transport vehicle (forklift) as disclosed in Document 2 (Japanese Patent Application Laid-Open No. 2023-030983) is known. This unmanned transport vehicle is equipped with an external sensor that detects the position of an object in a three-dimensional coordinate system, and (1) extracts points representing a horizontal plane from point group data, which is a set of points representing the position of the object, (2) extracts points within a predetermined range in the up-down direction from the horizontal plane as points representing the loading platform, and (3) extracts points representing an edge of the loading platform from the points representing the loading platform. The unmanned transport vehicle is further configured to (4) detect a straight line representing the edge from the points representing the edge, (5) extract points that are above the horizontal plane by a predetermined distance or more as points representing a load loaded on the loading platform, and (6) detect a position that is at a specified distance away from the load in the direction in which the straight line extends as a loading position for loading cargo onto the loading platform.

However, the method of detecting (extracting) a target object using this type of point group data includes processes such as clustering (classifying multiple point groups into certain sets) and pattern matching (for example, extracting a straight line portion). This method requires high accuracy (high resolution of the point group data) and, as a result, requires the use of a computer with high data processing power. Furthermore, with this method, the determination algorithm and pattern need to be adjusted for each target object, making it difficult to make the method versatile.

As shown in FIG. 10A, the truck T to be loaded is usually parked in a parking area SE in a predetermined orientation. Additionally, the width W of the cargo L may also be the width of a specified pallet on which the cargo is placed. Therefore, if the edge position Ex on the X-axis of an object (for example, cargo L) adjacent to the cargo placing space can be identified, a position located at a distance of half the width W from the edge position Ex in the opposite direction of the object can be determined as the cargo handling position LPx in the X-axis coordinate when placing the cargo. Further, as shown in FIG. 10B, if the edge position Ex on the X-axis of the cargo L placed on the loading platform Ta can be identified, a distance of half the width W from the edge position Ex toward the center side of the cargo L can be determined as the cargo handling position LPx in the X-axis coordinate when picking up the cargo. Here, in order to simplify the illustration in FIG. 10A and FIG. 10B, the width W of the cargo L is set to the width of the pallet, but the width W of the cargo L may not be the same as the pallet. For example, in a case where the width W of the cargo L is longer or shorter than the width of the pallet, the cargo handling position LPx can be determined as long as the width W of the cargo L is known or within a predetermined range.

Thus, in order to determine the cargo handling position in the X-axis coordinate, the disclosure provides a position identification system that is capable of identifying the edge position in the X-axis coordinate of an object adjacent to the cargo placing space relatively easily and versatilely.

SUMMARY

A position identification system according to the disclosure is configured to be used in a transport vehicle, and the position identification system includes: a point group acquisition part that horizontally irradiates light into a loading space to acquire a point group; an analysis part that analyzes the acquired point group using frequency distribution with a distance in an X-axis direction as an axis; and a position identification part that identifies a region with substantially no frequency as a cargo placing space based on an analysis result of the point group, and identifies a section with a predetermined frequency or more adjacent to the cargo placing space as a position of an edge in an X-axis coordinate of an object adjacent to the cargo placing space. In addition, the term "horizontal" according to the disclosure also includes angles that are not perpendicular to the direction of gravity, for example, when the ground has a slope.

In the above position identification system, only when a position of the point group acquisition part is included in a region with substantially no frequency on an X-axis and there are sections with a predetermined frequency or more on both sides of the region with substantially no frequency at this time, the position identification part identifies the sections as positions of edges in the X-axis coordinate of the object adjacent to the cargo placing space.

The above position identification system further includes a cargo handling target determination part that determines the object adjacent to the cargo placing space as cargo to be picked up.

In the above position identification system, the position identification part does not identify a region less than a predetermined distance away, among regions with substantially no frequency on the X-axis, as the cargo placing space.

In the above position identification system, the point group acquisition part horizontally irradiates light into a surrounding space that includes the loading space and is wider than the loading space in a horizontal direction.

In the above position identification system, the position identification part identifies a region with substantially no frequency adjacent to a loading space center side of an endmost region, among a plurality of regions with frequencies, on the X-axis as the cargo placing space, and identifies a position of an other section with a predetermined frequency or more adjacent to the identified cargo placing space on the X-axis as a position related to a cargo handling position of the transport vehicle.

In the above position identification system, the position identification part identifies a region with substantially no frequency adjacent to a loading space center side of an endmost region, among a plurality of regions with frequencies, on the X-axis as the cargo placing space, and identifies a position of a section with a predetermined frequency or more of the endmost region as a position related to a cargo handling position of the transport vehicle.

A transport vehicle according to the disclosure includes the position identification system described in any one of the above.

A position identification method according to the disclosure is used in a transport vehicle, and the position identification method includes: irradiating light horizontally into a loading space by a point group acquisition part to acquire a point group; analyzing the acquired point group using frequency distribution with a distance in an X-axis direction as an axis; identifying a region with substantially no frequency as a cargo placing space based on an analysis result of the point group; and identifying a section with a predetermined frequency or more adjacent to the cargo placing space as a position of an edge in an X-axis coordinate of an object adjacent to the cargo placing space.

In the above position identification method, only when a position of the point group acquisition part is included in a region with substantially no frequency on an X-axis and there are sections with a predetermined frequency or more on both sides of the region with substantially no frequency at this time, the sections are identified as positions of edges in the X-axis coordinate of the object adjacent to the cargo placing space.

The above position identification method further includes determining the object adjacent to the cargo placing space as cargo to be picked up.

In the above position identification method, a region less than a predetermined distance away, among regions with substantially no frequency on the X-axis, is not identified as the cargo placing space.

The above position identification method further includes: acquiring the point group by irradiating light horizontally into a surrounding space that includes the loading space and is wider than the loading space in a horizontal direction; identifying a region with substantially no frequency adjacent to a loading space center side of an endmost region, among a plurality of regions with frequencies, on the X-axis as the cargo placing space; and identifying a position of an other section with a predetermined frequency or more adjacent to the identified cargo placing space on the X-axis as a position related to a cargo handling position of the transport vehicle.

The above position identification method further includes: acquiring the point group by irradiating light horizontally into a surrounding space that includes the loading space and is wider than the loading space in a horizontal direction; and identifying a region with substantially no frequency adjacent to a loading space center side of an endmost region, among a plurality of regions with frequencies, on the X-axis as the cargo placing space, and identifying a position of a section with a predetermined frequency or more of the endmost region as a position related to a cargo handling position of the transport vehicle.

A position identification program according to the disclosure is a program to be used in a transport vehicle which includes a point group acquisition part that horizontally irradiates light into a loading space to acquire a point group, and a computer. The position identification program causes the computer to: analyze the acquired point group using frequency distribution with a distance in an X-axis direction as an axis; identify a region with substantially no frequency as a cargo placing space based on an analysis result of the point group; and identify a section with a predetermined frequency or more adjacent to the cargo placing space as a position of an edge in an X-axis coordinate of an object adjacent to the cargo placing space.

The position identification system according to the disclosure is capable of identifying the edge position in the X-axis coordinate of an object adjacent to a cargo placing space relatively easily and versatilely.

DESCRIPTION OF THE EMBODIMENTS

Figure 1:
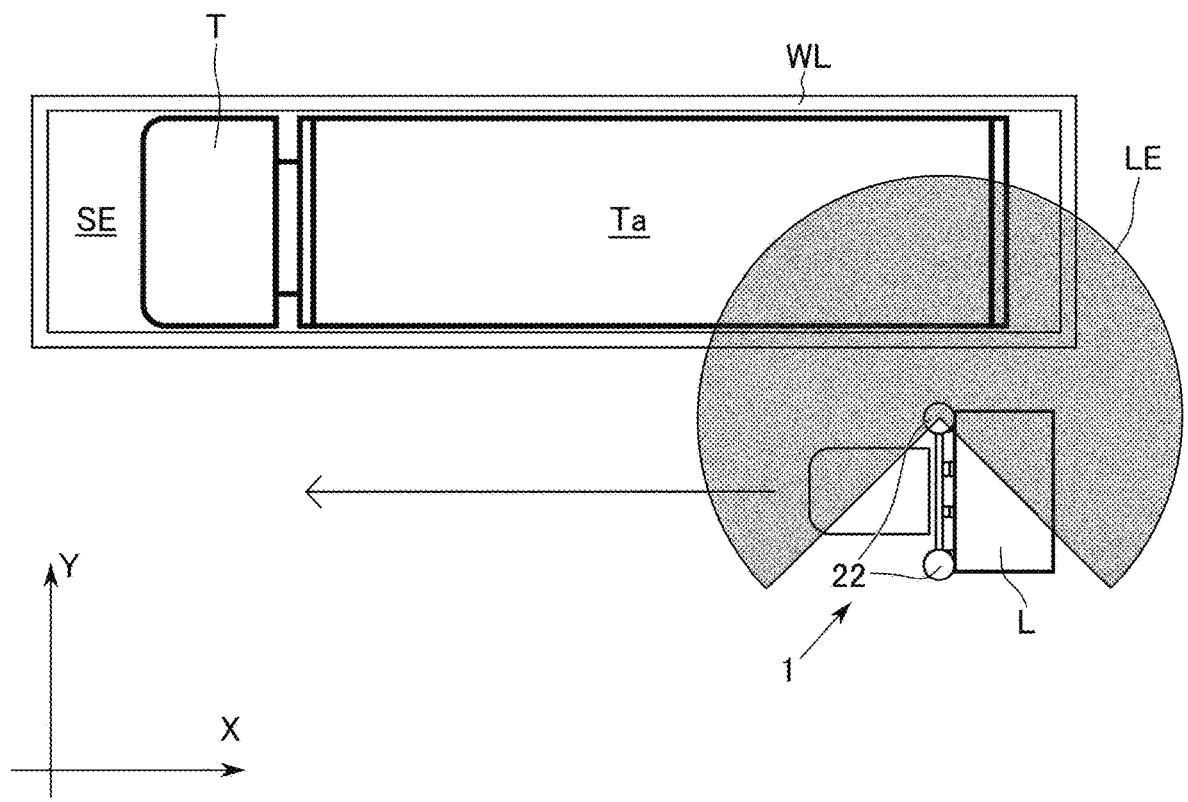
FIG. 1 is a plan view showing the truck and the unmanned transport vehicle according to an embodiment of the disclosure.

Hereinafter, an embodiment of a position identification system and a transport vehicle including the position identification system of the disclosure will be described with reference to the accompanying drawings. In the drawings, the double-headed arrow X indicates the front-rear direction (X-axis), the double-headed arrow Y indicates the left-right direction, and the double-headed arrow Z indicates the up-down direction.

FIG. 1 is a plan view showing a truck T and a transport vehicle 1 according to this embodiment. As shown in FIG. 1, the truck T has a loading platform Ta at the rear, and is parked in a parking area SE surrounded by a white line WL. The space above the loading platform Ta corresponds to the "loading space" of the disclosure, and the space above the parking area SE corresponds to the "surrounding space" of the disclosure. However, these are merely examples, and the location where cargo loading and unloading is performed in the disclosure is not limited to the loading platform Ta of the truck T. For example, if cargo loading and unloading is carried out using a shelf or container, the space above the shelf or container corresponds to the "loading space" of the disclosure, and the surrounding space including this shelf or container corresponds to the "surrounding space" of the disclosure.

In this embodiment, the transport vehicle 1 is configured to acquire a point group PG while traveling on the left or right side of the truck T from the rear to the front of the truck T, and perform cargo handling work at a cargo handling position LPx determined based on the acquired point group PG. In this embodiment, the transport vehicle 1 is configured to place cargo in the space in front of the loading platform Ta when placing cargo, and is configured to pick up cargo L on the rear side among multiple pieces of cargo L loaded on the loading platform Ta when picking up cargo. The transport vehicle 1 according to this embodiment is an unmanned transport vehicle that travels and handles cargo autonomously, but this is merely one example, and the transport vehicle according to the disclosure is not limited thereto. For example, the transport vehicle according to the disclosure may be a manned and unmanned transport vehicle.

<Configuration of the Transport Vehicle>

Figure 2:
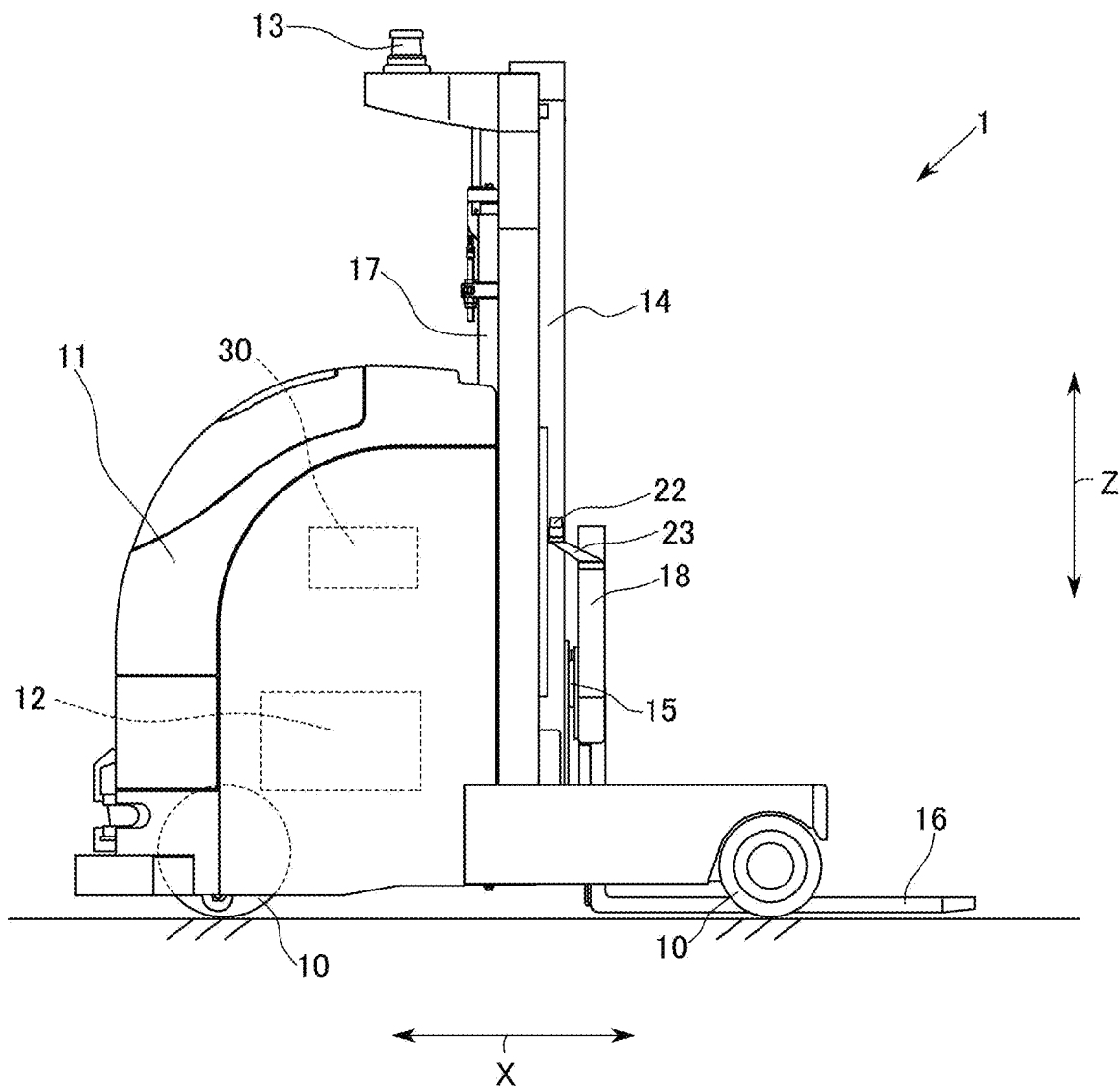
FIG. 2 is a side view showing the unmanned transport vehicle shown in FIG. 1.
Figure 3:
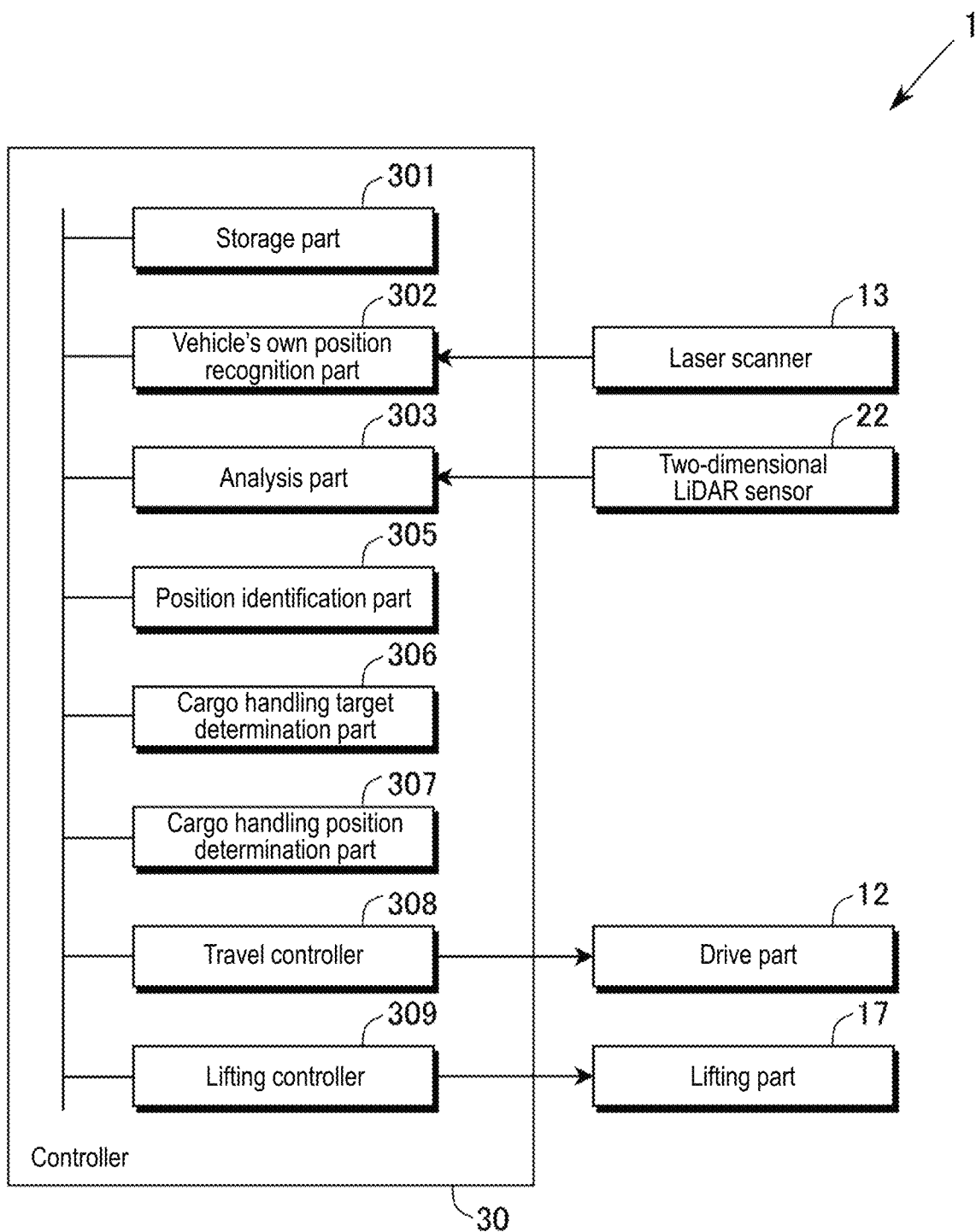
FIG. 3 is a block diagram of the unmanned transport vehicle.

FIG. 2 is a side view of the transport vehicle 1, and FIG. 3 is a block diagram of the transport vehicle 1. As shown in FIG. 2 and FIG. 3, the transport vehicle 1 includes a plurality of wheels 10, a vehicle body 11, a drive part 12, a laser scanner 13, left and right masts 14, a lift bracket 15, left and right forks 16, a lifting part 17, a backrest 18, left and right two-dimensional LiDAR sensors 22, left and right connecting portions 23, and a controller 30. The transport vehicle 1 is a reach forklift, but this is also merely one example, and the transport vehicle 1 according to the disclosure may also be a counter forklift.

The vehicle body 11 is disposed on the wheels 10, and the drive part 12 is disposed inside the vehicle body 11. The drive part 12 is configured to rotate and stop the wheels 10.

The laser scanner 13 is disposed above the vehicle body 11 and rotates horizontally to irradiate a laser and scan the reflected light of the laser.

The left and right masts 14 extend vertically and are disposed at the rear of the vehicle body 11. The lift bracket 15 has finger bars to which the left and right forks 16 are fixed, and is configured to be raised and lowered along the left and right masts 14 by the lifting part 17. In this embodiment, the number of forks 16 is four, but the number may be two or six, and is not particularly limited.

Figure 4A:
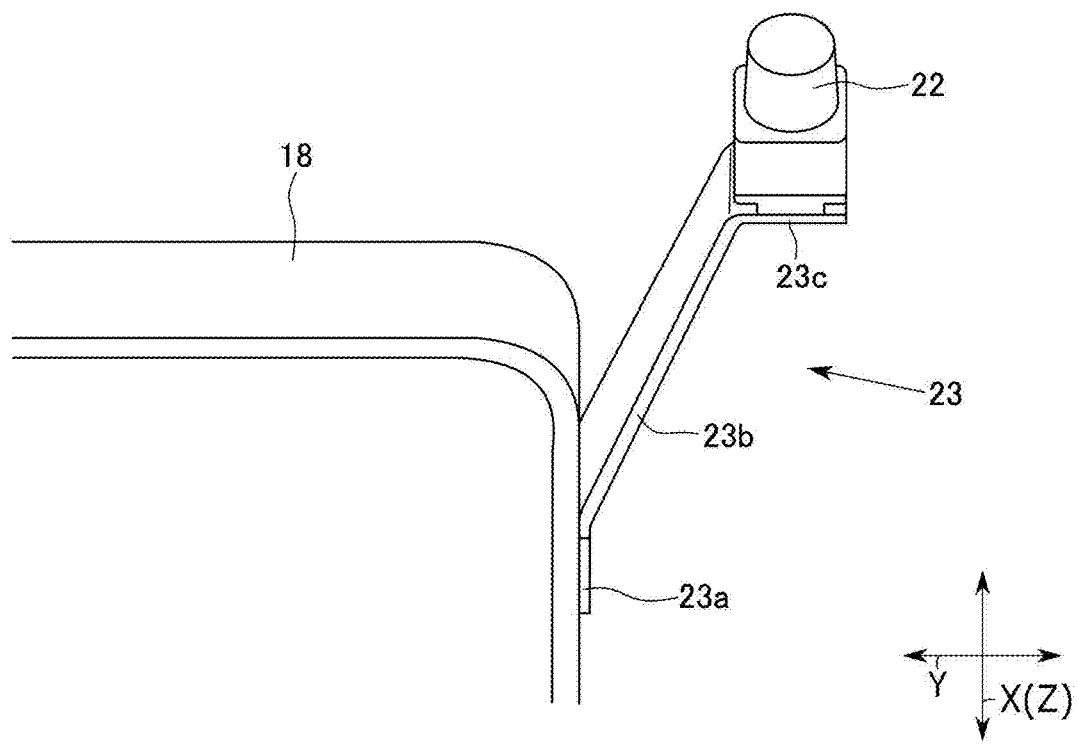
FIG. 4A is a perspective view showing the connecting portion shown in FIG. 2 seen from above on the rear.
Figure 4B:
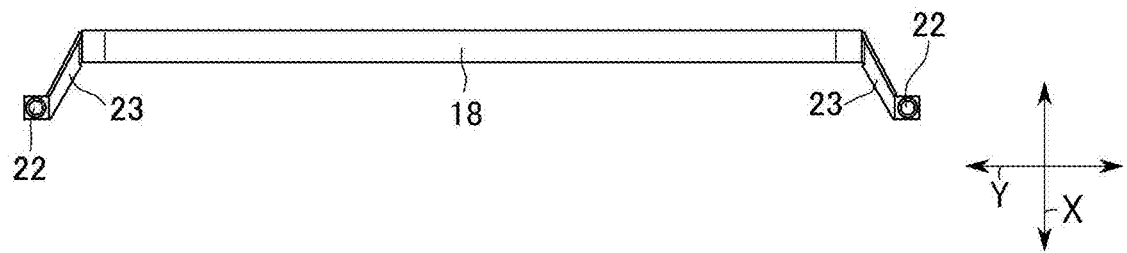
FIG. 4B is a plan view.
Figure 4C:
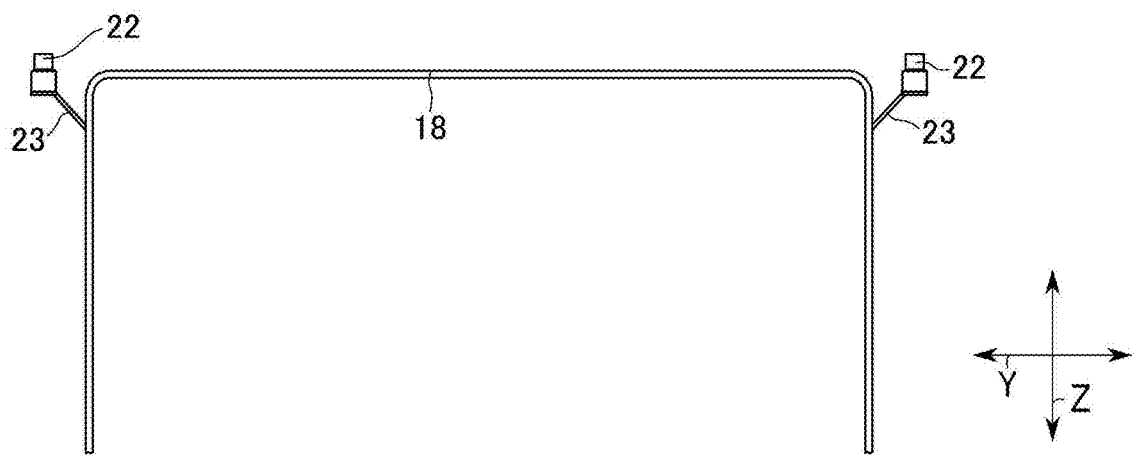
FIG. 4C is a rear view.

The backrest 18 is formed in a frame shape and extends vertically and horizontally, and is configured to receive the cargo L loaded thereon. In FIG. 4A to FIG. 4C, only the outer frame of the backrest 18 is shown, and this outer frame is disposed outside the vehicle body 11 in the left-right direction.

The left and right two-dimensional LiDAR sensors 22 are configured by laser scanners, and are configured to irradiate a laser while rotating in the horizontal direction and scan the reflected light of the laser to acquire the distance to the object irradiated with the laser in the form of the point group PG. The two-dimensional LiDAR sensor 22 corresponds to the "point group acquisition part" of the disclosure. The point group acquisition part according to the disclosure may be, for example, a three-dimensional LiDAR sensor or a three-dimensional ToF (Time of Flight) camera instead of the two-dimensional LiDAR sensor 22, and is not limited to a two-dimensional LiDAR sensor. Thus, the "light" in the disclosure includes not only visible light but also invisible light.

FIG. 4A to FIG. 4C show the connecting portion 23, wherein FIG. 4A is a perspective view seen from above on the rear (the fork 16 side), FIG. 4B is a plan view, and FIG. 4C is a rear view. The connecting portion 23 has a first end portion 23a, a middle portion 23b, and a second end portion 23c. The first end portion 23a is respectively fixed to the left and right ends of the backrest 18, and the middle portion 23b extends from the first end portion 23a diagonally forward of the backrest 18 in a plan view. The second end portion 23c has a horizontal surface that continues from the middle portion 23b, and supports the two-dimensional LiDAR sensor 22 by the horizontal surface. The position of the second end portion 23c is configured to be disposed outside the cargo L loaded on the forks 16 and the side surface of the vehicle body 11 in the left-right direction. Thus, the laser of the two-dimensional LiDAR sensor 22 is irradiated toward the parking area SE including the loading platform Ta without being blocked by the loaded cargo L or the vehicle body 11.

Figure 5A:
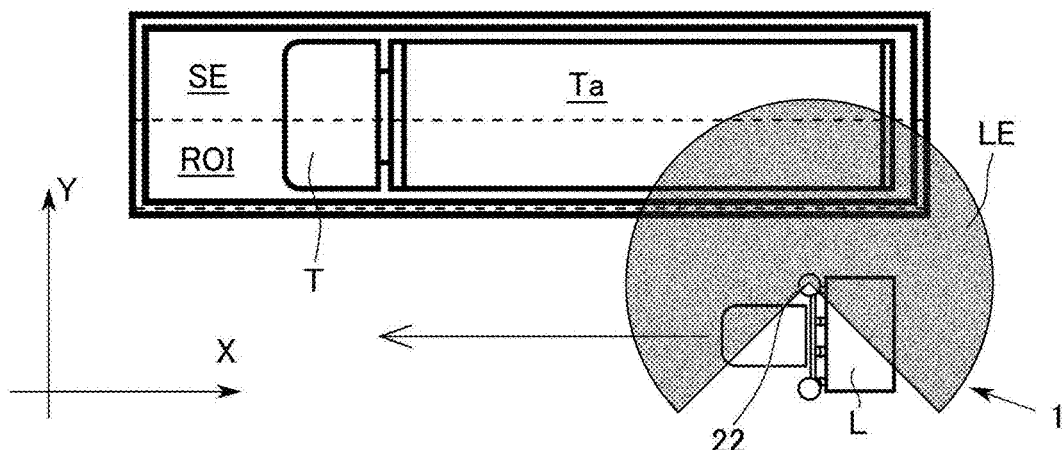
FIG. 5A is a plan view showing the irradiation of laser of the two-dimensional LiDAR sensor on the right side.
Figure 5B:
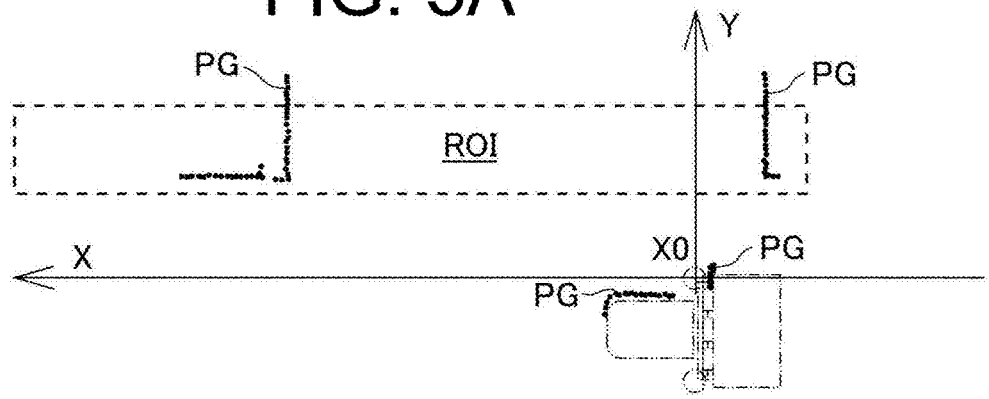
FIG. 5B is a diagram showing the point group acquired by the two-dimensional LiDAR sensor on the right side.

FIG. 5A shows an example of a laser irradiation range LE of the two-dimensional LiDAR sensor 22, and shows the traveling direction of the transport vehicle 1. The laser irradiation range LE is not limited to this range, and the laser may be irradiated so as to reach the range of the entire parking area SE. As shown in FIG. 5A, the transport vehicle 1 travels on a side of the truck T from the rear to the front, and the two-dimensional LiDAR sensor 22 irradiates a laser while rotating horizontally, and receives the reflected light, thereby acquiring the distance to the object at each irradiation angle. This distance data is acquired as a point group PG, as shown in FIG. 5B. The intersection of the X-axis and the Y-axis in FIG. 5B indicates the position of the two-dimensional LiDAR, which is the origin X0. The point group PG in the attached drawings is an image diagram for showing an example of the acquired point group PG, and is not the actually acquired point group PG.

In the disclosure, the acquisition of the point group PG performed by the two-dimensional LiDAR sensor 22 may be performed while the transport vehicle 1 is stopped, and the transport vehicle 1 is not required to travel in parallel to the truck T in order to acquire the point group PG.

If the absolute position coordinates of the transport vehicle 1 can be recognized by known techniques, the absolute position coordinates of the two-dimensional LiDAR sensor 22 can also be identified, and the position of the acquired point group PG can also be identified on the absolute coordinate axis. That is, FIG. 5B is also a diagram showing the point group PG shown on the absolute coordinate axis, and the current positional relationship of the transport vehicle 1 with respect to the point group PG.

As shown in FIG. 2, the controller 30 is disposed inside the vehicle body 11. The controller 30 is configured by a computer having a storage device, a calculation part, and a memory. The storage device stores a position identification program that causes the computer to execute an edge position identification method.

<Functional Configuration of the Controller>

Next, the functional configuration of the controller 30 will be described. As shown in FIG. 3, the controller 30 includes a storage part 301, a vehicle's own position recognition part 302, an analysis part 303, a position identification part 305, a cargo handling target determination part 306, a cargo handling position determination part 307, a travel controller 308, and a lifting controller 309. The system including the two-dimensional LiDAR sensor 22 (point group acquisition part), the analysis part 303, the position identification part 305, and the cargo handling target determination part 306 corresponds to the "position identification system" of the disclosure.

The storage part 301 stores the position (X coordinate, Y coordinate) of the parking area SE, the front or rear orientation of the stopped truck T, the width W of the cargo L, and the height to which the forks 16 are raised during cargo loading and unloading.

The vehicle's own position recognition part 302 recognizes the current position of the transport vehicle 1 by detecting the positions of reflectors disposed within the facility from the reflected light scanned by the laser scanner 13.

Figure 5C:
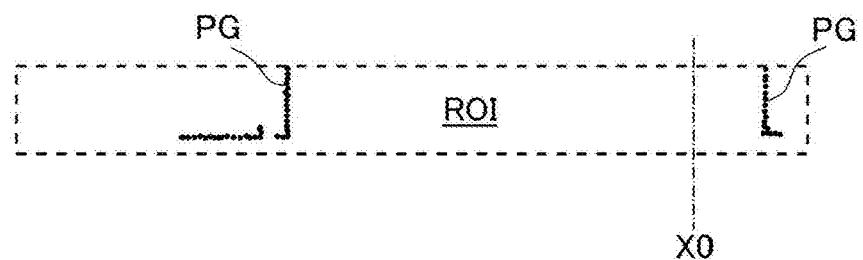
FIG. 5C is a diagram showing the mask processing of the point group of FIG. 5B within a predetermined range.

The analysis part 303 analyzes the acquired point group PG using frequency distribution with the distance in the X-axis direction as an axis. Specifically, as shown in FIG. 5C, the analysis part 303 first limits the acquired point group PG to a point group PG within an ROI (Region of Interest), which is the range indicated by the dashed line in FIG. 5B and FIG. 5C. Thus, the analysis part 303 eliminates the unnecessary point group PG. Next, the analysis part 303 analyzes the point group PG within the ROI using frequency distribution at a distance in the X-axis direction from the origin X0 on the X-axis (front-rear direction) as shown in FIG. 5D.

Figure 5D:
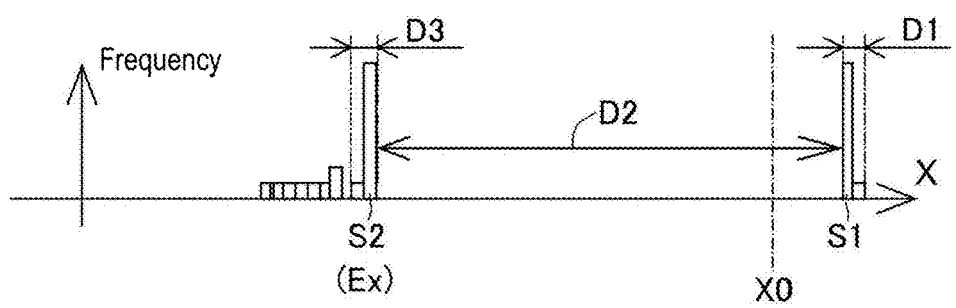
FIG. 5D is a diagram showing the point group of FIG. 5C as a histogram in the X-axis direction.

The region D2 with no frequency in FIG. 5D indicates a region where the reflection of the laser received by the two-dimensional LiDAR sensor 22 is extremely lower than other regions or absent. "Substantially no frequency" in the disclosure means to exclude a case where a region in which there is nothing has a frequency due to noise or the like. The analysis part 303 may use known techniques to perform analysis by removing frequencies due to noise or ignoring low frequencies. In the following, the expression "substantially no frequency" will be abbreviated to "no frequency."

In addition, since each section has a range of values, the average value of the numerical values in each section may be set as the position (X coordinate) of that section, or the minimum value or maximum value in each section may be set as the position (X coordinate) of each section.

As shown in FIG. 5D, based on the analysis result of the point group PG, the position identification part 305 identifies the region D2 with no frequency as a cargo placing space, and identifies sections S1 and S2 with a predetermined frequency or more adjacent to the cargo placing space as the positions of the edges in the X-axis coordinate of the object adjacent to the cargo placing space. By setting the "predetermined frequency or more," the position identification part 305 can appropriately identify the section related to the edge of the object on the X-axis, among the sections of the regions D1 and D3 with frequencies. The minimum frequency for identifying the edge position is appropriately set in advance so as to identify the section of the edge of this object while preventing other sections from being erroneously recognized as the section of the edge.

The position identification part 305 preferably identifies the sections S1 and S2 as the positions of the edges in the X-axis coordinate of the object adjacent to the cargo placing space only when the position (origin X0) of the two-dimensional LiDAR sensor 22 is included in the region D2 with no frequency on the X-axis and there are the sections S1 and S2 with a predetermined frequency or more on both sides of the region D2 with no frequency at this time.

Thus, the position identification part 305 prevents a simple space from being erroneously recognized as the cargo placing space. For example, since the parking area SE has a length that is sufficiently longer than the overall length of the truck T, it is assumed that there are spaces in front of and behind the stopped truck T. Then, the two-dimensional LiDAR sensor 22 does not acquire a point group PG from the space above this space. Therefore, the position identification part 305 does not erroneously identify a simple space in front of or behind the truck T as the cargo placing space. Further, examples of erroneous recognition include a case where the parking position of the truck T is far beyond the parking area SE in the rear direction, and as a result, the cab part of the truck T is recognized as the endmost region D1 on the side where traveling starts and thus a simple space in front of the cab is erroneously recognized as the cargo placing space. Even in such a case, the position identification part 305 identifies the sections S1 and S2 as the positions of the edges in the X-axis coordinate of the object adjacent to the cargo placing space only when the position (origin X0) of the two-dimensional LiDAR sensor 22 is included in the region D2 with no frequency and there are the sections S1 and S2 with a predetermined frequency or more on both sides of the region D2. In other words, the position identification part 305 identifies the region D2 with no frequency as the cargo placing space only when the position (origin X0) of the two-dimensional LiDAR sensor 22 is included in the region D2 with no frequency and there are the sections S1 and S2 with a predetermined frequency or more on both sides of the region D2. In this way, the position identification part 305 prevents a simple space from being erroneously recognized as the cargo placing space.

Figure 6A:
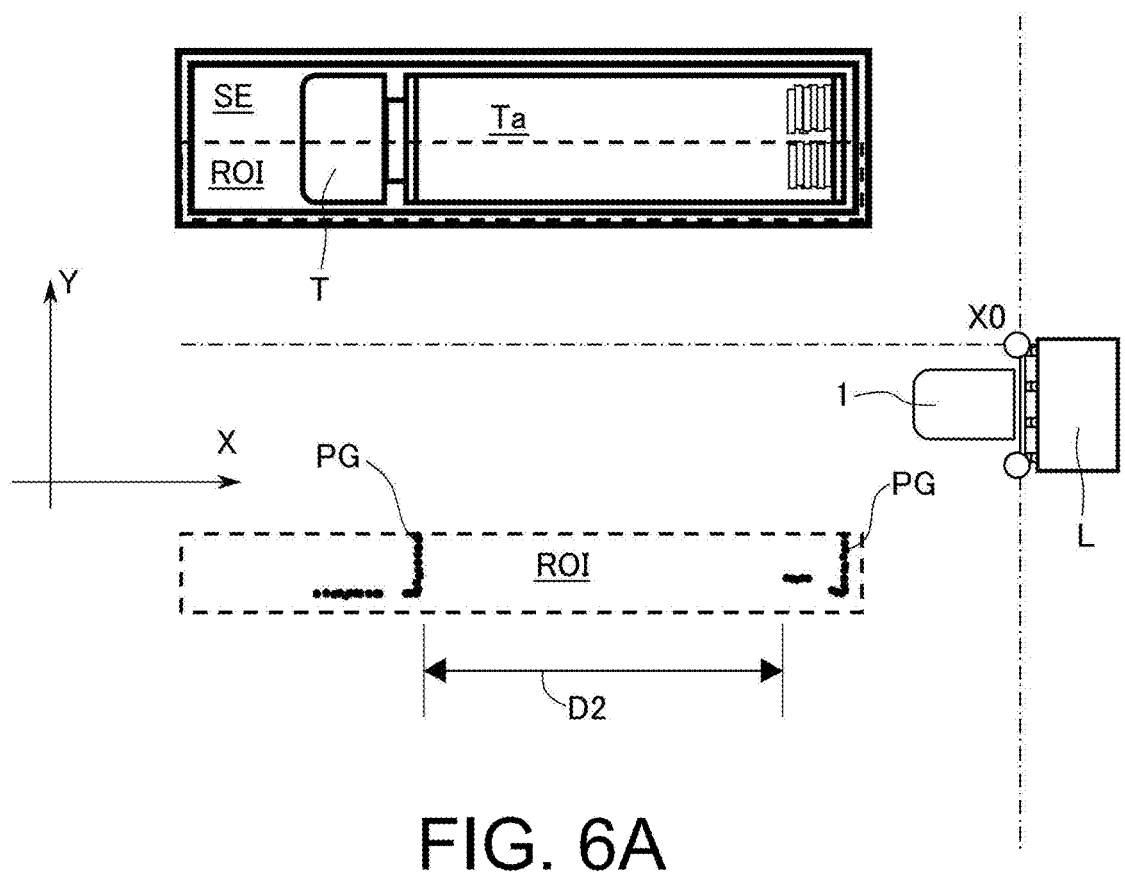
FIG. 6A shows the point group data when obtaining a point group at a position behind the truck.
Figure 6B:
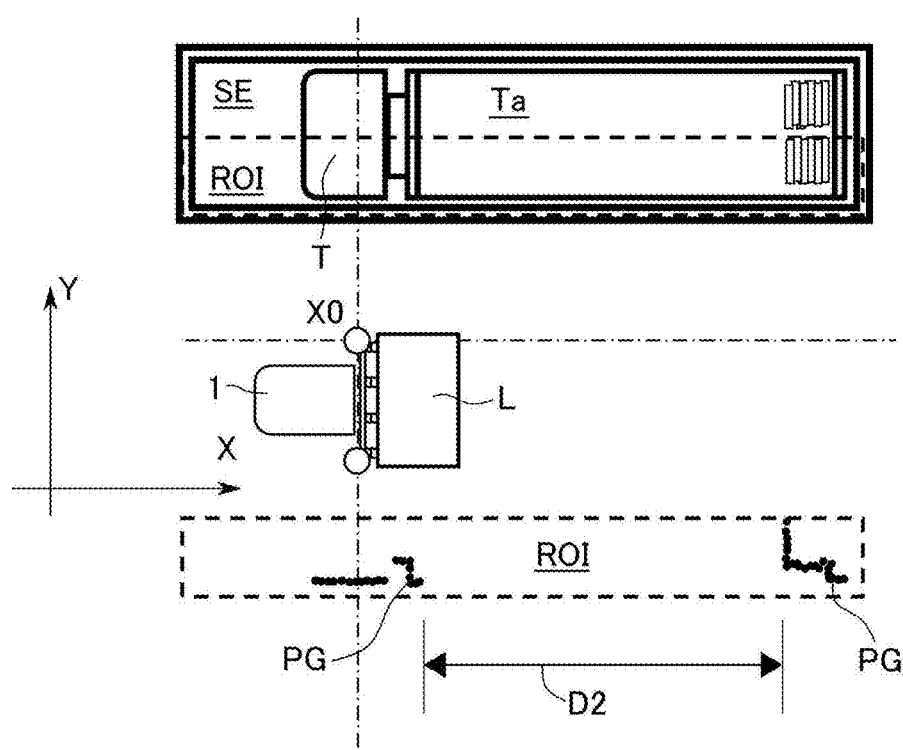
FIG. 6B shows the point group data when obtaining a point group on a side of the cab of the truck.

Furthermore, the effects of the edge position identification method performed by the position identification part 305 will be described with reference to FIG. 6A and FIG. 6B. FIG. 6A shows data of the point group PG when the point group PG is acquired at a rear position of the truck T, and FIG. 6B shows data of the point group PG when the two-dimensional LiDAR sensor 22 is positioned on a side of the cab of the truck T. As shown in FIG. 6A and FIG. 6B, gaps occur in the regions of the point groups PG related to objects that are in the blind spot from the position of the two-dimensional LiDAR sensor 22. However, as shown in FIG. 5D, the position identification part 305 identifies the region D2 with no frequency as the cargo placing space only when the origin X0 is included in the region D2 with no frequency and there are the sections S1 and S2 with a predetermined frequency or more on both sides of the region D2, so gaps in the apparent point groups PG related to the blind spot are not erroneously recognized as the cargo placing space.

In particular, as shown in FIG. 5D, the position identification part 305: (1) identifies the region D2 with no frequency adjacent to the loading space center side of the endmost region D1 on the side where traveling starts for point group acquisition, among multiple regions with frequencies, on the X-axis as the cargo placing space, and (2) then identifies the position of the section S2 with a predetermined frequency or more in the other region D3 (the traveling direction side) adjacent to the cargo placing space on the X-axis as the position Ex related to the cargo handling position LPx of the transport vehicle 1. Thus, the position identification part 305 can further prevent gaps in the apparent point group PG in FIG. 6A and FIG. 6B from being erroneously recognized as the cargo placing space.

When picking up cargo, the cargo handling target determination part 306 determines the object on the traveling direction side (front side) on the X-axis, among two objects adjacent to the cargo placing space, as the cargo to be picked up. In another embodiment, in the case of setting to pick up multiple pieces of cargo L loaded on the loading platform Ta in order starting from the cargo L on the front side, the cargo handling target determination part 306 determines the object on the opposite side (rear side) in the traveling direction on the X-axis, among the two objects adjacent to the cargo placing space, as the cargo to be picked up.

When placing cargo, the cargo handling position determination part 307 determines a position at a distance of half the width W of the cargo L from the position Ex in the opposite direction of the traveling direction as the cargo handling position LPx in the X-axis coordinate.

Furthermore, when picking up cargo, the cargo handling position determination part 307 determines a position at a distance of half the width W from the position Ex in the traveling direction as the cargo handling position LPx in the X-axis coordinate. The cargo handling position determination part 307 determines the Y coordinate by referring to the Y coordinate, etc. of the parking area SE stored in the storage part 301. Alternatively, the cargo handling position determination part 307 may determine the Y coordinate by other known techniques, and the method of determining the Y coordinate of the cargo handling position is not particularly limited.

The travel controller 308 is configured to control the drive part 12, and causes the transport vehicle 1 to travel to the cargo handling position LPx while referring to the current position acquired by the laser scanner 13 when the cargo handling position determination part 307 determines the cargo handling position LPx.

The lifting controller 309 is configured to control the lifting part 17, and causes the lifting part 17 to raise the forks 16 to the height at the time of cargo loading and unloading stored in the storage part 301, thereby causing the transport vehicle 1 to perform cargo handling work.

Thus, the transport vehicle 1 can identify the edge position Ex on the X-axis of the object adjacent to the cargo placing space by analyzing the point group PG acquired by the two-dimensional LiDAR sensor 22 using frequency distribution. This allows the transport vehicle 1 to identify the edge position Ex relatively easily and versatilely, and determine the cargo handling position LPx. It should be noted that the histogram in FIG. 5D is provided for illustrating the frequency distribution in this specification, and the controller 30 is not particularly required to create the histogram.

FIG. 7A to FIG. 7C and FIG. 8A to FIG. 8C show other examples in which the edge position Ex can be acquired by frequency distribution analysis performed by the transport vehicle 1.

Figure 7A:
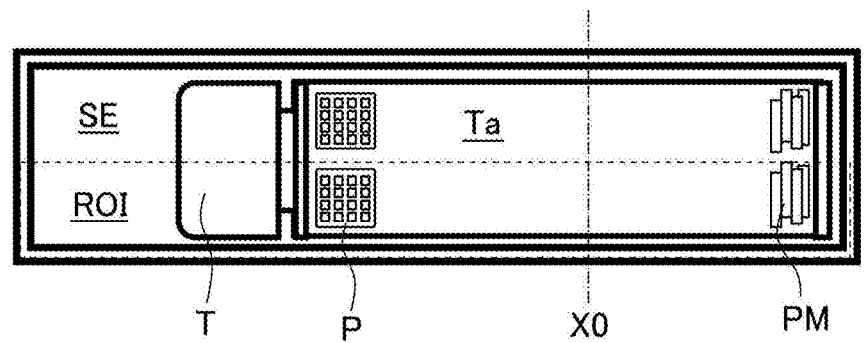
FIG. 7A is a plan view showing the loading platform on which protective materials and pallets are disposed.
Figure 7B:
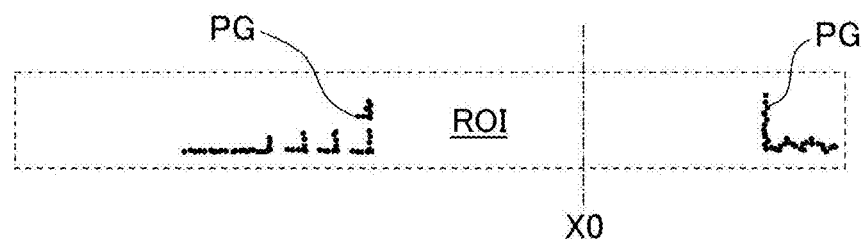
FIG. 7B is a diagram showing the point group acquired by the two-dimensional LiDAR sensor on the right side with respect to the loading platform of FIG. 7A.
Figure 7C:
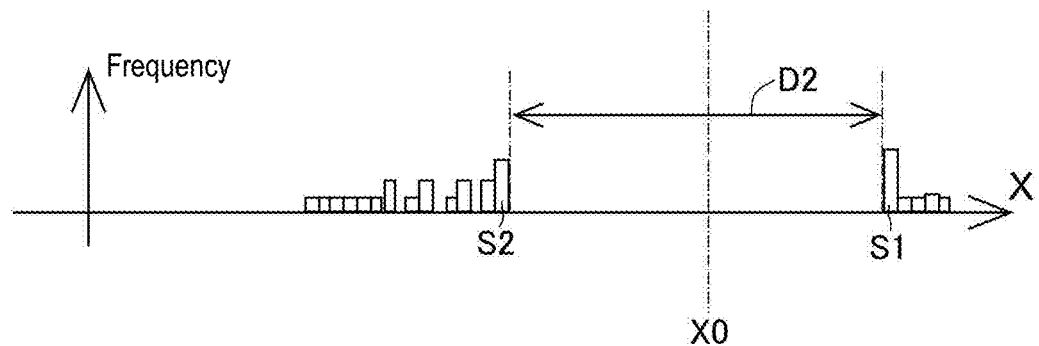
FIG. 7C is a diagram showing the point group of FIG. 7B as a histogram in the X-axis direction.

FIG. 7A is a plan view showing an example in which a pallet P is loaded in place of a spacer on the front part of the loading platform Ta, and a protective material PM is placed on the rear part of the loading platform Ta. In this case, the transport vehicle 1 also acquires a point group PG by the two-dimensional LiDAR sensor 22 as shown in FIG. 7B, and appropriately identifies the cargo placing space by analyzing the point group PG using frequency distribution as shown in FIG. 7C. Furthermore, the transport vehicle 1 appropriately identifies the edge positions of the pallet P at the front and rear of the cargo placing space and the edge positions of the protective material PM as the edge positions of the front and rear objects adjacent to the cargo placing space. Thus, the transport vehicle 1 can appropriately place the cargo L in the cargo placing space even if there is an obstacle with an irregular shape placed on the loading platform Ta.

Figure 8A:
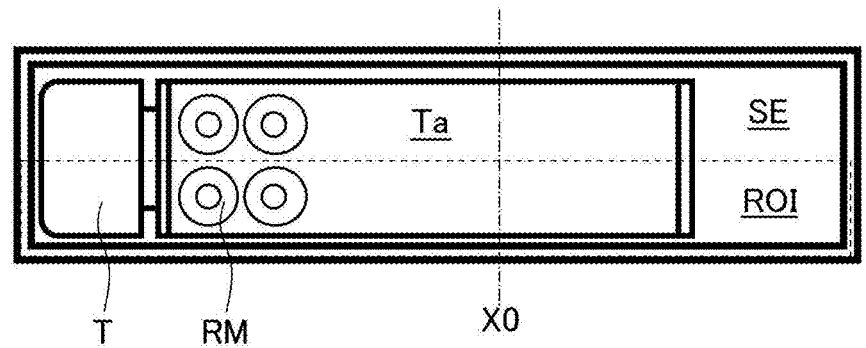
FIG. 8A is a plan view showing the loading platform on which cylindrical members are disposed.
Figure 8B:
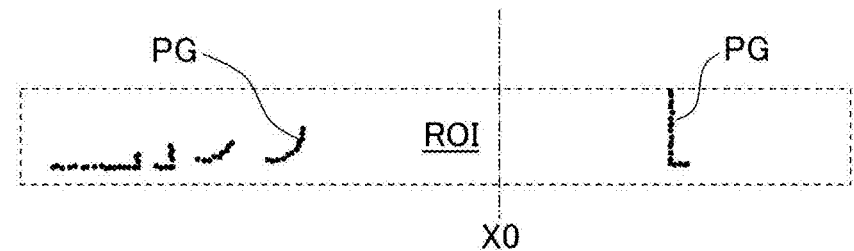
FIG. 8B is a diagram showing the point group acquired by the two-dimensional LiDAR sensor on the right side with respect to the loading platform of FIG. 8A.
Figure 8C:
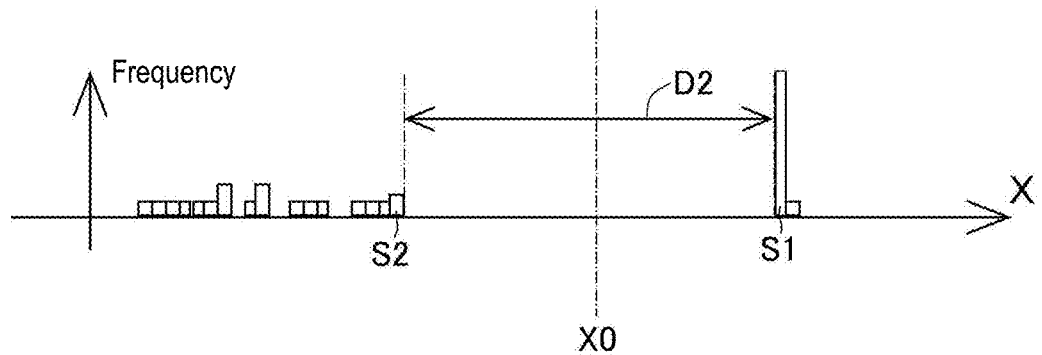
FIG. 8C is a diagram showing the point group of FIG. 8B as a histogram in the X-axis direction.

FIG. 8A is a plan view showing an example in which a cylindrical member RM is placed on the front part of the loading platform Ta. In this case, the transport vehicle 1 also acquires a point group PG as shown in FIG. 8B, and appropriately identifies the cargo placing space by analyzing the point group PG using frequency distribution as shown in FIG. 8C. Furthermore, the transport vehicle 1 appropriately identifies the edge position of the cylindrical member RM at the front of the cargo placing space as the edge position of the front object adjacent to the cargo placing space. Thus, the transport vehicle 1 can appropriately place the cargo L in the cargo placing space even if there is an obstacle with a round side surface placed on the loading platform Ta.

<Flow of the Operation of the Transport Vehicle>

Next, the flow of the operation of the transport vehicle 1 according to this embodiment will be described with reference to FIG. 9.

Figure 9:
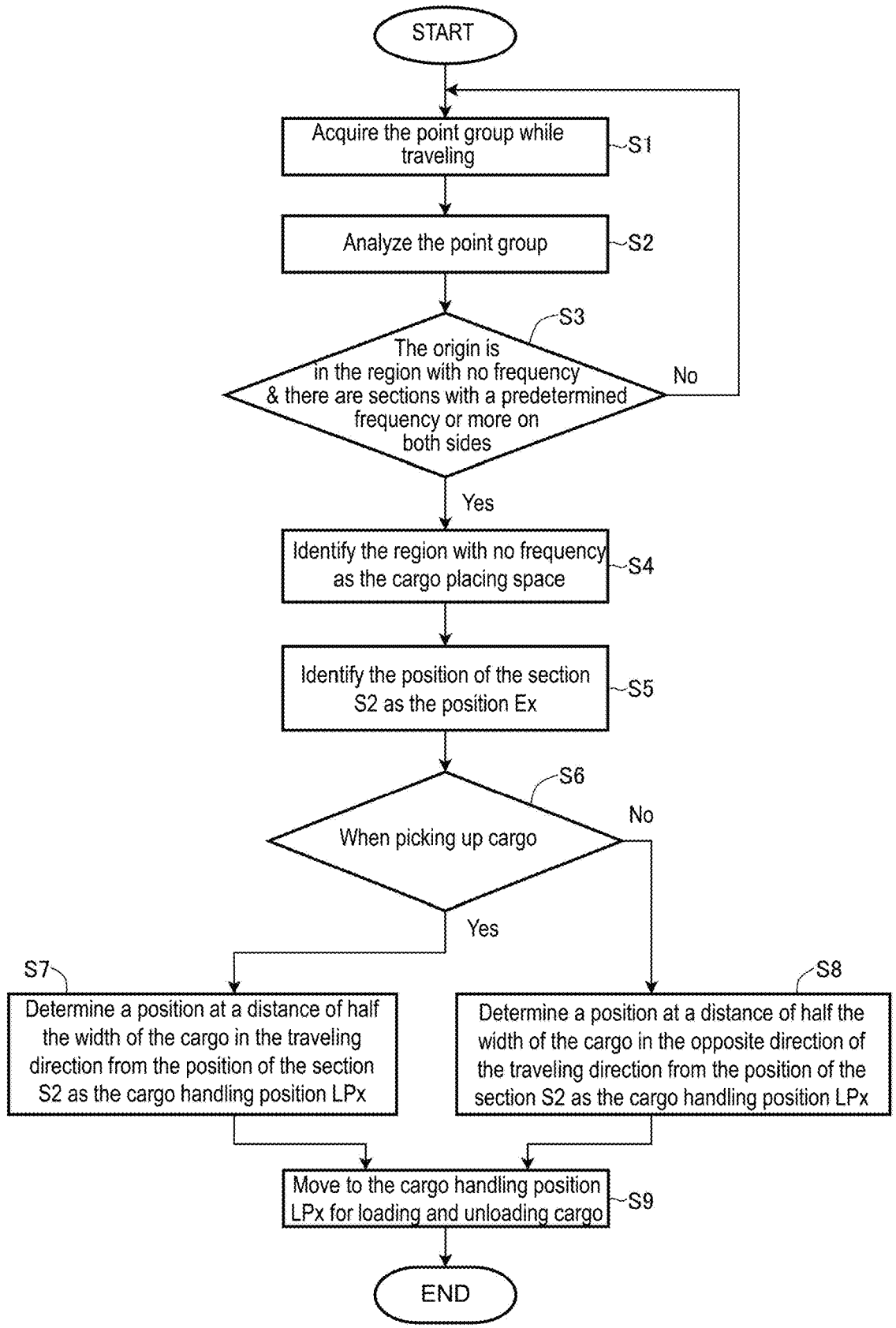
FIG. 9 is a flow chart showing the flow of the operation of the unmanned transport vehicle.
Figure 10A:
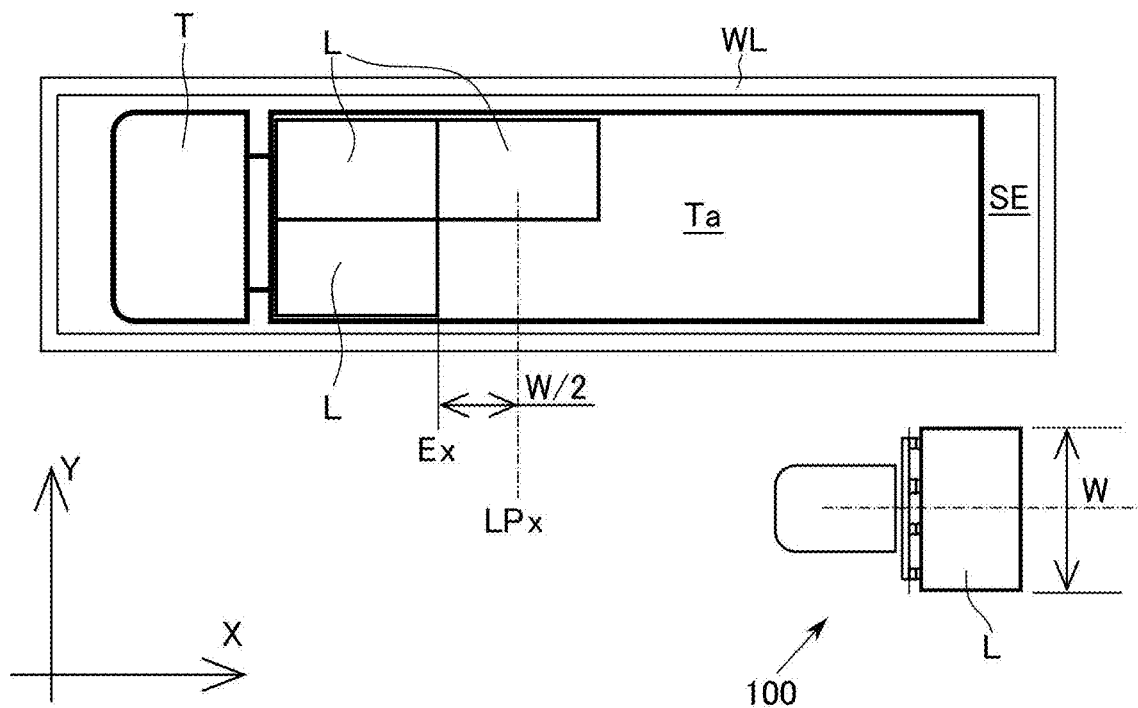
FIG. 10A and FIG. 10B are plan views showing a conventional unmanned transport vehicle and the loading platform of a truck.
Figure 10B:
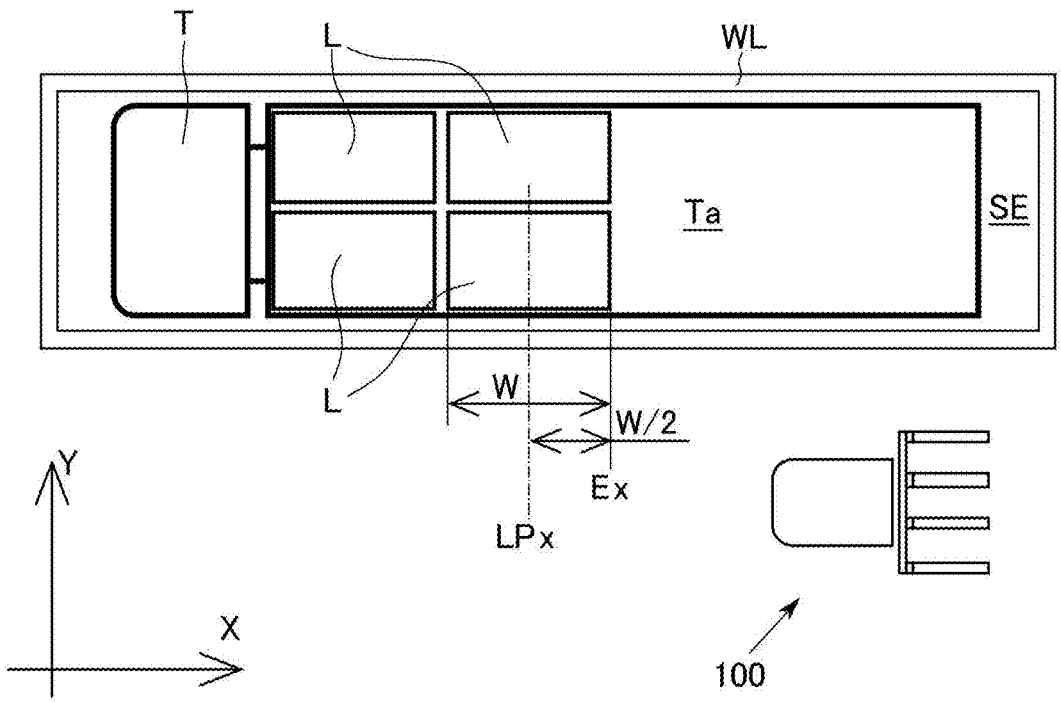

(1) First, the transport vehicle 1 acquires the point group PG of the parking area SE while traveling from the rear to the front of the truck T (see S (step) 1 of FIG. 9).

(2) Next, the transport vehicle 1 analyzes the acquired point group PG using frequency distribution (see S2 of FIG. 9).

(3) Next, when the position (origin X0) of the two-dimensional LiDAR sensor 22 is included in the region D2 with no frequency on the X-axis and there are sections S1 and S2 with a predetermined frequency or more on both sides of the region D2 with no frequency at this time (Yes in S3 of FIG. 9), the transport vehicle 1 identifies the region D2 with no frequency as the cargo placing space (S4 of FIG. 9).

(4) Next, the transport vehicle 1 identifies the position of the section S2 with a predetermined frequency or more adjacent to the cargo placing space in the traveling direction as the position Ex related to the cargo handling position LPx of the transport vehicle 1 (S5 of FIG. 9).

(5) Next, the transport vehicle 1 determines a position at a distance of half the width W of the cargo L in the traveling direction from the position of the section S2 as the cargo handling position LPx (S7 of FIG. 9) when picking up cargo (Yes in S6 of FIG. 9), and determines a position at a distance of half the width W of the cargo L in the opposite direction of the traveling direction from the position of the section S2 as the cargo handling position LPx (S8 of FIG. 9) when placing cargo (No in S6 of FIG. 9).

(6) Next, the transport vehicle 1 moves to the determined cargo handling position LPx and performs cargo handling work (S9 of FIG. 9).

By operating in this manner, the transport vehicle 1 can relatively easily identify the edge position Ex on the X-axis of the object adjacent to the cargo placing space, determine the cargo handling position LPx, and autonomously perform cargo handling work. In addition, even if the length of the loading platform Ta differs for each truck T, or the front and rear parking positions of the truck T differ for each driver, the transport vehicle 1 can still identify the edge position Ex stably to determine the cargo handling position LPx.

Although one embodiment of the position identification system and the transport vehicle including the position identification system of the disclosure has been described above, the disclosure is not limited to the above embodiment. For example, the position identification system and the transport vehicle according to the disclosure may be implemented as each of the following modifications or in any suitable combination of the following modifications.

MODIFICATION (1) In a case of setting to place the cargo L from the rear of the loading platform Ta, the position identification part 305 identifies the region D2 (see FIG. 5D) with substantially no frequency adjacent to the loading space center side of the region D1 (see FIG. 5D) on the side where traveling starts, among multiple regions with frequencies, on the X-axis as the cargo placing space, and then identifies the position of the section S1 (see FIG. 5D) with a predetermined frequency or more in the region D1 as the position Ex related to the cargo handling position LPx of the transport vehicle 1. Then, the cargo handling position determination part 307 determines a position at a distance of half the width W of the cargo L in the opposite direction of the traveling direction from the position Ex as the cargo handling position LPx when picking up cargo, and determines a position at a distance of half the width W of the cargo L in the traveling direction from the position Ex as the cargo handling position LPx when placing cargo.

(2) The transport vehicle 1 may be configured to travel and acquire the point group PG in the opposite direction to that of the above embodiment, that is, from the front of the truck T. In this case, the position identification part 305 identifies the region D2 (see FIG. 5D) with substantially no frequency adjacent to the loading space center side of the endmost region D1 (see FIG. 5D) in the traveling direction, among multiple regions with frequencies, on the X-axis as the cargo placing space, and then identifies the position of the section S2 (see FIG. 5D) with a predetermined frequency or more on the other side adjacent to the identified cargo placing space as the position Ex related to the cargo handling position LPx of the transport vehicle 1. Then, the cargo handling position determination part 307 determines a position at a distance of half the width W of the cargo L in the opposite direction of the traveling direction from the position Ex as the cargo handling position LPx when picking up cargo, and determines a position at a distance of half the width W of the cargo L in the traveling direction from the position Ex as the cargo handling position LPx when placing cargo.

(3) The position identification part 305 may be configured not to identify a region less than a predetermined distance away, among regions with no frequency on the X-axis, as the cargo placing space. Thus, for example, even when a region with no frequency is generated in the gap between the cab and the loading platform Ta, the position identification part 305 can prevent the region related to this gap from being identified as the cargo placing space. In addition to this, even when there is a gap between the members disposed on the loading platform Ta as shown in FIG. 8A to FIG. 8C, the position identification part 305 can prevent this gap from being identified as the cargo placing space.

(4) The transport vehicle 1 may be provided with the point group acquisition part 22 on only one side, either the left or right side. In this case, if the transport vehicle 1 has the point group acquisition part 22 only on the right side, the transport vehicle 1 can travel from the rear to the front of the truck T on the left side of the truck T, and travels from the front to the rear of the truck T on the right side of the truck T, so as to acquire the point group PG appropriately.

What is claimed is:

1. A position identification system, configured to be used in a transport vehicle, the position identification system comprising:
   a point group acquisition part that horizontally irradiates light into a loading space to acquire a point group;
   an analysis part that analyzes the acquired point group using frequency distribution with a distance in an X-axis direction as an axis; and
   a position identification part that identifies a region with substantially no frequency as a cargo placing space based on an analysis result of the point group, and identifies a section with a predetermined frequency or more adjacent to the cargo placing space as a position of an edge in an X-axis coordinate of an object adjacent to the cargo placing space.

2. The position identification system according to claim 1, wherein only when a position of the point group acquisition part is included in a region with substantially no frequency on an X-axis and there are sections with a predetermined frequency or more on both sides of the region with substantially no frequency at this time, the position identification part identifies the sections as positions of edges in the X-axis coordinate of the object adjacent to the cargo placing space.

3. The position identification system according to claim 1, further comprising a cargo handling target determination part that determines the object adjacent to the cargo placing space as cargo to be picked up.

4. The position identification system according to claim 1, wherein the position identification part does not identify a region less than a predetermined distance away, among regions with substantially no frequency on the X-axis, as the cargo placing space.

5. The position identification system according to claim 1, wherein the point group acquisition part horizontally irradiates light into a surrounding space that includes the loading space and is wider than the loading space in a horizontal direction.

6. The position identification system according to claim 5, wherein the position identification part identifies a region with substantially no frequency adjacent to a loading space center side of an endmost region, among a plurality of regions with frequencies, on the X-axis as the cargo placing space, and identifies a position of an other section with a predetermined frequency or more adjacent to the identified cargo placing space on the X-axis as a position related to a cargo handling position of the transport vehicle.

7. The position identification system according to claim 5, wherein the position identification part identifies a region with substantially no frequency adjacent to a loading space center side of an endmost region, among a plurality of regions with frequencies, on the X-axis as the cargo placing space, and identifies a position of a section with a predetermined frequency or more of the endmost region as a position related to a cargo handling position of the transport vehicle.

8. A transport vehicle, comprising the position identification system according to claim 1.

9. A position identification method, to be used in a transport vehicle, the position identification method comprising:

irradiating light horizontally into a loading space by a point group acquisition part to acquire a point group;

analyzing the acquired point group using frequency distribution with a distance in an X-axis direction as an axis;

identifying a region with substantially no frequency as a cargo placing space based on an analysis result of the point group; and identifying a section with a predetermined frequency or more adjacent to the cargo placing space as a position of an edge in an X-axis coordinate of an object adjacent to the cargo placing space.

10. The position identification method according to claim 9, wherein only when a position of the point group acquisition part is included in a region with substantially no frequency on an X-axis and there are sections with a predetermined frequency or more on both sides of the region with substantially no frequency at this time, the sections are identified as positions of edges in the X-axis coordinate of the object adjacent to the cargo placing space.

11. The position identification method according to claim 9, further comprising determining the object adjacent to the cargo placing space as cargo to be picked up.

12. The position identification method according to claim 9, wherein a region less than a predetermined distance away, among regions with substantially no frequency on the X-axis, is not identified as the cargo placing space.

13. The position identification method according to claim 9, further comprising:

acquiring the point group by irradiating light horizontally into a surrounding space that includes the loading space and is wider than the loading space in a horizontal direction;

identifying a region with substantially no frequency adjacent to a loading space center side of an endmost region, among a plurality of regions with frequencies, on the X-axis as the cargo placing space; and identifying a position of an other section with a predetermined frequency or more adjacent to the identified cargo placing space on the X-axis as a position related to a cargo handling position of the transport vehicle.

14. The position identification method according to claim 9, further comprising:

acquiring the point group by irradiating light horizontally into a surrounding space that includes the loading space and is wider than the loading space in a horizontal direction; and identifying a region with substantially no frequency adjacent to a loading space center side of an endmost region, among a plurality of regions with frequencies, on the X-axis as the cargo placing space, and identifying a position of a section with a predetermined frequency or more of the endmost region as a position related to a cargo handling position of the transport vehicle.

15. A non-transient computer-readable recording medium, recording a position identification program, to be used in a transport vehicle which comprises a point group acquisition part that horizontally irradiates light into a loading space to acquire a point group, and a computer, the position identification program causing the computer to:

analyze the acquired point group using frequency distribution with a distance in an X-axis direction as an axis;

identify a region with substantially no frequency as a cargo placing space based on an analysis result of the point group; and identify a section with a predetermined frequency or more adjacent to the cargo placing space as a position of an edge in an X-axis coordinate of an object adjacent to the cargo placing space.

\* \* \* \* \*